Nov. 6, 1945.                C. A. ARENS                2,388,241
                          TRANSMISSION CABLE
                          Filed Sept. 23, 1943
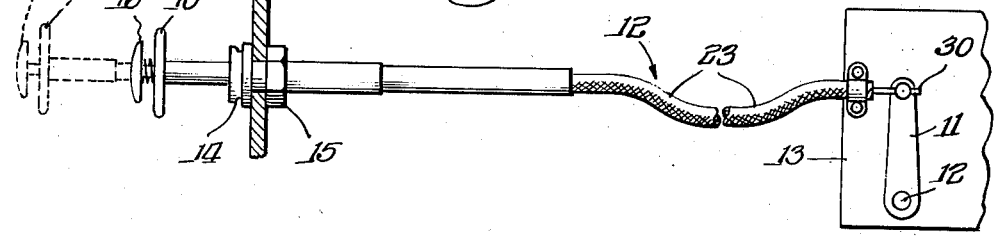
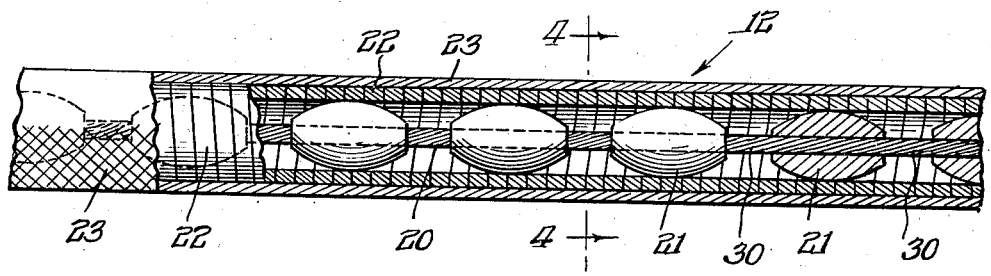
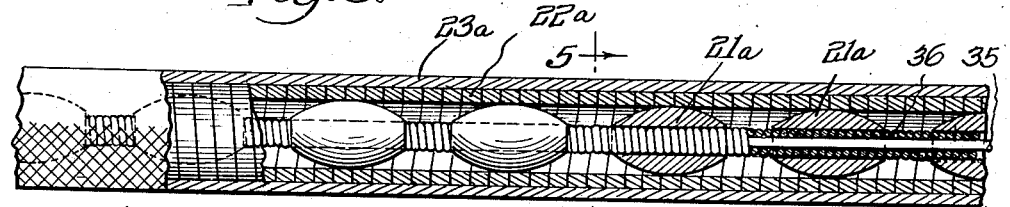
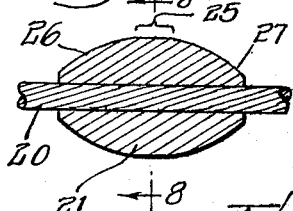
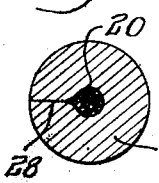
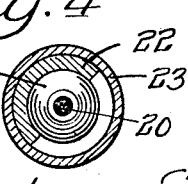
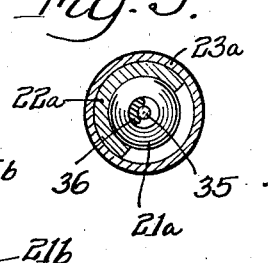
INVENTOR.
Charles A. Arens Patented Nov. 6, 1945

2,388,241

UNITED STATES PATENT OFFICE 2,388,241

TRANSMISSION CABLE

Charles A. Arens, Chicago, Ill., assignor to Arens Controls, Inc., Chicago, Ill., a corporation of Illinois Application September 23, 1943, Serial No. 503,509

7 Claims. (Cl. 74—501)

This invention relates to transmission cables, particularly of the type adapted to transmit longitudinal reciprocative control movements.

It is an object of the invention to provide an improved transmission cable structure. More specifically, it is an object of the invention to provide an improved and simplified transmission cable structure which can be more readily fabricated and assembled, and which has improved operating characteristics in use.

A further object of the invention is to provide an essentially one piece transmission cable, of composite structure, wherein the various cable elements cooperate in a novel manner to enable the cable to absorb compression as well as tension, and accurately transmit longitudinal control movements.

A still further object of the invention is to provide a transmission cable of the spaced bearing member type wherein the shiftable elements of the cable comprise essentially a one piece integrally united structure, without joints or relatively sliding or shifting elements.

Another object of the invention is to provide a transmission cable of the type defined wherein relative adjustment of the shiftable cable elements is not required either initially or upon continued cable use, and wherein the compression resisting characteristics of the structure are not impaired in use.

Still another object of the invention is to provide in a cable of the type defined, an improved form of bearing element.

Various other objects, advantages and features of the invention will be apparent from the following specification, when taken in connection with the accompanying drawing, wherein certain preferred embodiments of the invention are set forth for purposes of illustration.

In the drawing wherein like reference numerals refer to like parts throughout:

Fig. 1 is a general assembly view of a control installation having a transmission cable constructed in accordance with and embodying the principles of the invention.

Fig. 2 is a longitudinal sectional view of the transmission cable shown in Fig. 1, on an enlarged scale and illustrating the details of construction.

Fig. 3 is a view similar to Fig. 2, but showing a modified form of structure.

Fig. 4 is a transverse sectional view of the structure of Fig. 2, and taken as indicated by the line 4—4 thereof.

Fig. 5 is a transverse sectional view of the structure of Fig. 3, and taken as indicated by the line 5—5 thereof.

Fig. 6 is a detailed sectional view, on a further enlarged scale, of one of the bearing members, showing certain of the details of construction.

Fig. 7 is a transverse sectional view through the bearing member of Fig. 6, showing the condition of the member prior to its application to the central core wire.

Fig. 8 is a view similar to Fig. 7, but showing the bearing member after application to and mounting upon the core wire, and taken as indicated by the line 8—8 of Fig. 6; and Figs. 9 and 10 are detail views illustrating modified forms of bearing members.

In the drawing the transmission cable of the invention has been illustrated as embodied in a control installation of the type, for example, utilized for operating the controls of vehicles or the like. It is to be understood, however, that the transmission cable of the invention is of general utility, and may be adapted for use with various types of installations particularly wherein the transmission cable is called upon accurately to transmit longitudinal reciprocative control and operating movements.

Referring more specifically to the drawing, in Fig. 1 the control installation illustrated comprises a reciprocable control handle 10 adapted to be connected to a device 11 to be controlled, by means of a transmission cable generally indicated by the numeral 12. The control handle is illustrated as being mounted upon a dashboard 13 by means of a pair of clamp nuts 14 and 15, and is adapted for longitudinal reciprocation through the dashboard. By way of illustration, the control handle may, for example, be of the type shown in Arens Patent No. 2,161,661, dated June 6, 1939, and comprises in addition to the main operating member 10, a locking button 16 by means of which the operating member may be locked or held in various adjusted positions.

The device 11 to be controlled, in the particular embodiment shown, comprises a lever pivotally mounted as indicated at 12 upon the casing 13 of the controlled device. In operation, as the control handle 10 is either pushed or pulled, and thereby adjusted to various reciprocative positions, corresponding increments of movement are longitudinally transmitted to the controlled device 11, to effect the corresponding positioning thereof.

The transmission cable structure by which these longitudinal reciprocative control movements are transmitted is best illustrated in Figs.

2 and 4. As shown, the movable elements of the transmission cable comprise a central core wire 20 upon which there is fixed at predetermined spaced intervals a series of bearing members 21. The core wire 20 may take various forms, and may comprise either a piano wire or a stranded cable. However, as illustrated, a stranded wire is preferred in the embodiment shown, as a stranded wire is possessed of maximum flexibility whereby to permit flexing or curving of the transmission cable in installations where such flexing or curving is required, for example as indicated in Fig. 1.

The movable elements of the cable, comprising the core wire 20 and the bearing members 21, are shiftable as a unit within a stationary sheath member 22 having an outer cover 23. The sheath, as illustrated in Fig. 2, comprises a helically wound wire coil, whereby the sheath is flexible and may be curved into a desired shape, as shown in Fig. 1, to meet the installation requirements of any particular installation. As will be understood, in certain installations flexibility will not be required, and in such cases the sheath may comprise a substantially rigid tube. The outer covering 23 may preferably comprise rubber or suitable waterproof fabric forming a protective and waterproof coating for the sheath coil 22.

The manner in which the bearing members 21 are mounted in predetermined spaced relation upon the core wire 20, and the detailed construction of the bearing members, will be best understood by reference to Figs. 6, 7, and 8. The bearing members may be variously formed to meet the requirements of any particular installation, but in the illustrated embodiment and as shown in Fig. 6, the bearing members are of general oval construction, being provided with a substantially flat or cylindrical portion 25 adapted for bearing engagement with the sheath coil, and generally conical or tapered portions 26 and 27 extending oppositely away from the substantially cylindrical portion 25. The generally flat or cylindrical central surface 25 of the generally oval shaped bearing members provides for slightly increased areas of contact between the bearing members and the sheath coil 22, whereby to facilitate the sliding movements of the members, and also to minimize the reduction in diameter of the bearing members due to wear. At the same time the areas of contact between the bearing members and the coil are relatively limited, as will be understood, thus minimizing friction and facilitating the ready sliding of the shiftable cable elements within the sheath structure.

As shown in Fig. 7, the bearing members are provided with a radial slit 28 extending along the length thereof. In mounting the bearing members upon the core wire 20, the core wire is introduced into this slit and the bearing members then swedged thereon, as indicated in Fig. 8, whereby the outer portions of the slit 28 are substantially closed and the core wire is firmly clamped within the inner portion thereof. By this means it will be seen that the bearing members are firmly fixed upon the central core wire 20, so that after assembly thereon, the bearing members and core wire constitute essentially a one piece structure.

During the swedging operation, the bearing members are accurately brought to size.

In accordance with the principles of the invention, it is contemplated that the bearing members will be secured, specifically swedged, upon the core wire at sufficiently closely spaced intervals so as to enable the core wire to absorb axial compression without any bending due to the compressive stresses, within the limits of the forces to be transmitted. As will be understood, in extended lengths a core wire such as piano wire, or a simple stranded cable, exhibits relatively low resistance to compression and will readily bend upon the application of compressive stresses. However, by fixing the bearing members in closely spaced relation upon the core wire, substantially as indicated in the drawing, the unsupported portions 30 of the core wire between the bearing members are so reduced in length as to enable the core wire to absorb the compressive forces, within the limits of use, without bending or distortion due to such compressive forces. In an illustrative embodiment of $\frac{1}{16}''$ core or cable, for example, the spacing between the bearing members may preferably be on the order of $\frac{1}{8}''$ to $\frac{3}{16}''$, although it will be understood that this is by way of illustration rather than limitation. In the embodiment illustrated, it will be seen that the spacing between the bearing members is less than half the length of the bearing members.

In Figs. 3 and 5 a modified structural embodiment is illustrated, generally similar to that previously described, but embodying a modified form of core structure. In this instance the core comprises a central wire 35, which may be either a piano wire or stranded cable, and an encompassing wire coil 36. The central wire 35 and coil wire 36 are secured together at their ends, for example, by swedging or the like, the two wires thus constituting a composite core structure upon which the bearing members 21a may be swedged as in the embodiment previously described. In some instances a composite core structure, as illustrated in Figs. 3 and 5, may be preferred to the form of core shown in Fig. 2.

In the operation of either structural embodiment it will be seen that the central core and spaced bearing members constitute an essentially one piece structure shiftable as a unit within the stationary cable sheath, and enabled accurately to transmit longitudinal reciprocative control movements. There are no relative sliding movements between the various shiftable cable elements, and accordingly no initial tensioning adjustments of the cable are required, nor will the shiftable cable parts become loose from wear or continued service. On the contrary, the over-all length of the shiftable cable structure remains constant throughout the life of the cable.

The close spacing of the bearing members enables the simple core structure to absorb compression as well as tension, without bending, thus enabling the cable accurately to correlate the movements of the control and controlled devices. The essentially one piece character of the shiftable cable elements precludes backlash, sponginess, or looseness in the structure. The structure may be readily fabricated, and has a minimum of friction between the shifting and stationary parts. The sheath, and also the core structure, may be bent or curved to conform to the assembly requirements of any particular installation.

If desired, a lubricant may be introduced into the pockets formed within the sheath between the bearing members. The bearing surfaces 25 of the bearing members render the bearing members self-aligning within the sheath, and also insure a minimum decrease in size of the bearing members due to wear, while at the same time minimizing friction.

As indicated, the bearing members may be variously shaped to meet the requirements of any particular installation. In Figs. 9 and 10 two modified forms of bearing members are illustrated. In Fig. 9 it will be seen that the cylindrical portion 25a is of increased extent with respect to the portion 25 of the bearing member shown in Fig. 6. In Fig. 10 the cylindrical portion 25b is of still further increased length. The increased areas 25a and 25b provide increased stability in the movements of the bearing members, as may in some instances be required.

While it is preferred that the bearing members be swedged on the core wire, as indicated above, obviously the bearing members may be soldered if desired, and may be applied over the end of the core wire and moved longitudinally into position.

It is obvious that various changes may be made in the specific embodiments shown and described without departing from the spirit of the invention. The invention is, accordingly not to be limited to the precise embodiments shown and described, but only as indicated in the following claims.

The invention is hereby claimed as follows:

1. A transmission cable comprising an elongated core, a plurality of bearing members disposed in spaced relation longitudinally of the core, said bearing members being spaced apart a distance less than their axial length and said bearing members being individually immovably fixed on the core and arranged to support the core substantially along the entire length of the bearing members, and a sheath within which the core and bearing members are longitudinally slidable as a unit.

2. A transmission cable as defined in claim 1 wherein the bearing members are individually swedged on the core.

3. A transmission cable comprising an elongated core, a plurality of bearing members disposed in spaced relation longitudinally of the core, said bearing members being provided with radial slits through which the core extends, the bearing members being individually swedged on the core, and a sheath within which the core and bearing members are longitudinally slidable as a unit.

4. A transmission cable comprising an elongated core of substantially uniform diameter, a plurality of bearing members disposed in spaced relation longitudinally of the core, said bearing members being spaced apart a distance less than their axial length and said bearing members being individually immovably fixed on the core and arranged to support the core substantially along the entire length of the bearing members, the core constituting the sole connecting means between the bearing members, and a sheath within which the core and bearing members are longitudinally slidable as a unit.

5. A transmission cable comprising an elongated core, a plurality of bearing members disposed in spaced relation longitudinally of the core, said bearing members being spaced apart a distance less than their axial length, and said bearing members being of general oval shape and being individually immovably fixed on the core and arranged to support the core substantially along the entire length of the bearing members, and a sheath within which the core and bearing members are longitudinally slidable as a unit.

6. A transmission cable comprising an elongated core, a plurality of bearing members disposed in spaced relation longitudinally of the core, said bearing members being spaced apart a distance less than their axial length, and said bearing members being of general oval shape and being individually immovably fixed on the core and arranged to support the core substantially along the entire length of the bearing members, and a sheath within which the core and bearing members are longitudinally slidable as a unit, said bearing members being provided with substantially cylindrical surfaces at their mid-portions for bearing engagement with the sheath.

7. A transmission cable as defined in claim 4, wherein said bearing members are provided with radial slits through which the core extends, and wherein the bearing members are individually swedged on the core in said predetermined spaced relation.

CHARLES A. ARENS.